United States Patent [19]

Amon

[11] Patent Number: 5,735,223
[45] Date of Patent: Apr. 7, 1998

[54] METHOD FOR DISPOSING OF PAPER IN AN ASPHALT PLANT

[76] Inventor: Thomas R. Amon, 219 Sunset Dr., Elkhorn, Wis. 53121

[21] Appl. No.: 645,952

[22] Filed: May 10, 1996

Related U.S. Application Data

[63] Continuation-in-part of Ser. No. 371,161, Jan. 11, 1995, Pat. No. 5,520,124.

[51] Int. Cl.⁶ .................................................. B23K 3/02
[52] U.S. Cl. ........................... 110/226; 110/236; 110/246; 366/23; 366/25; 432/106
[58] Field of Search ..................... 110/226, 246, 110/261; 34/137, 131; 366/25, 7, 23, 147; 432/103, 105

[56] References Cited

U.S. PATENT DOCUMENTS

| | | | |
|---|---|---|---|
| 4,253,405 | 3/1981 | Cottrell et al. | 110/222 |
| 5,018,459 | 5/1991 | Judd | 110/346 |
| 5,054,406 | 10/1991 | Judd | 110/346 |
| 5,090,813 | 2/1992 | McFarland et al. | 366/23 |
| 5,176,445 | 1/1993 | Mize | 366/7 |
| 5,178,456 | 1/1993 | Marconnet | 366/25 |
| 5,257,587 | 11/1993 | Ohlsen et al. | 110/346 |
| 5,273,355 | 12/1993 | May et al. | 366/23 |
| 5,297,957 | 3/1994 | Brashears | 432/14 |
| 5,342,442 | 8/1994 | Nechvatal et al. | 106/409 |
| 5,392,721 | 2/1995 | Judd | 110/346 |

FOREIGN PATENT DOCUMENTS

| | | | |
|---|---|---|---|
| 1012010 | 6/1977 | Canada | 110/246 |
| 2 242005 | 9/1990 | Japan | 110/244 |
| 1 384 474 | 2/1975 | United Kingdom | 110/244 |

*Primary Examiner*—Henry A. Bennett
*Assistant Examiner*—Pamela O'Connor
*Attorney, Agent, or Firm*—Michael, Best & Friedrich

[57] ABSTRACT

An asphalt plant for producing asphalt paving, the asphalt plant including: a) a dryer unit for heating stone aggregate, the dryer unit including a container and a burner for producing a flame to provide thermal energy for heating the stone aggregate in the container; b) a supply of burner fuel for providing fuel for the burner flame; c) a supply of burner air for providing oxygen to the burner flame; and d) the dryer unit including a grate which is spaced from the burner, the grate defining a plurality of openings, such that the burner flame extends through the openings, and such that the grate improves the thermal efficiency of the dryer unit for heating the stone aggregate.

22 Claims, 3 Drawing Sheets

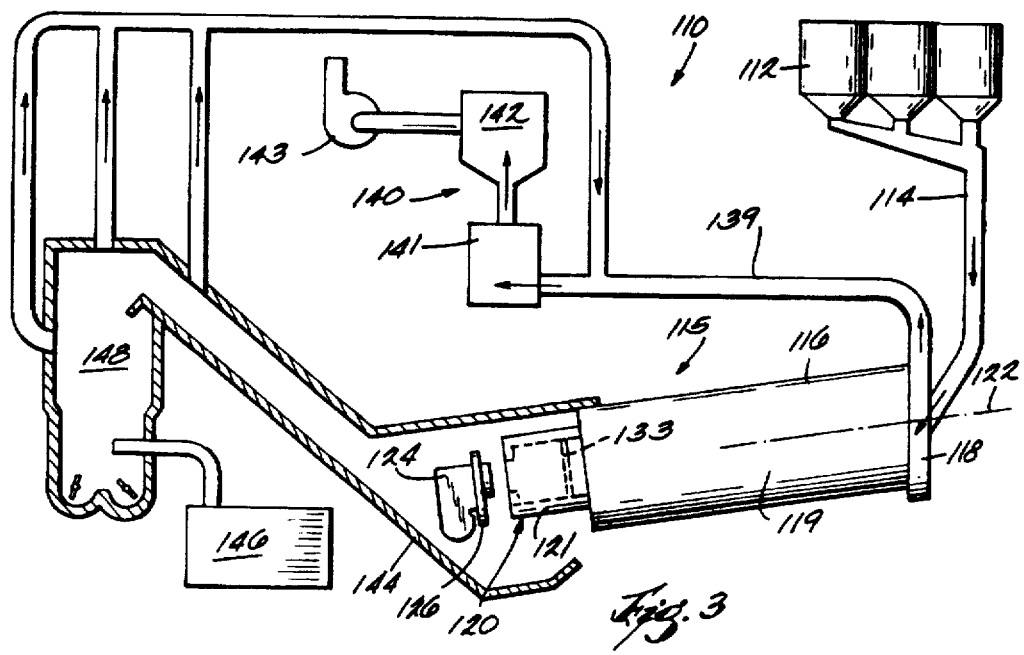
Fig. 3
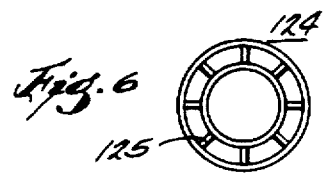
Fig. 6
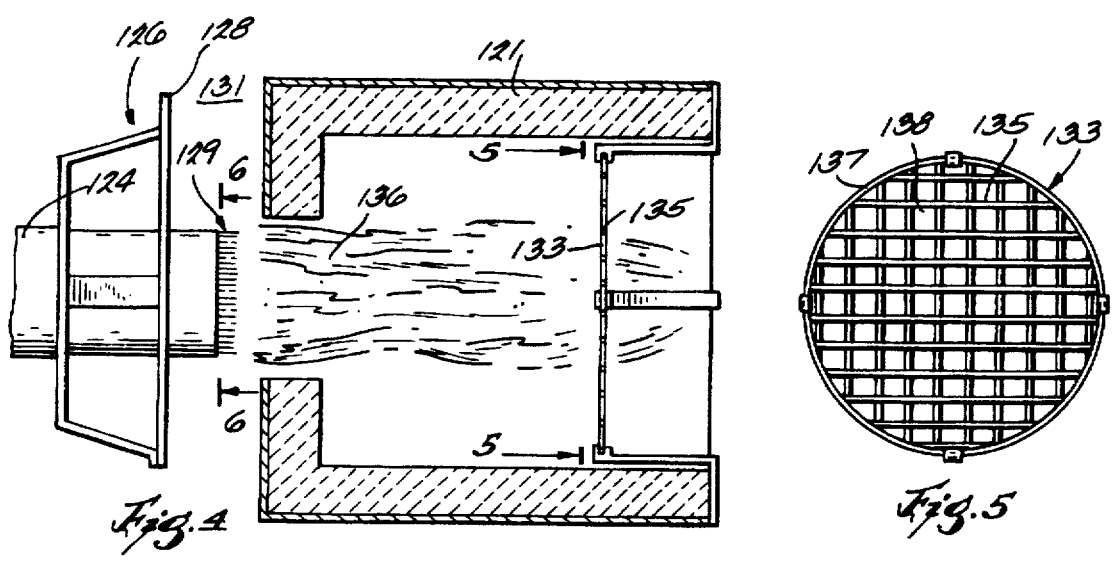
Fig. 4
Fig. 5

5,735,223

1

METHOD FOR DISPOSING OF PAPER IN AN ASPHALT PLANT

This application is a continuation-in-part of application Ser. No. 08/371,161 filed Jan. 11, 1995 now U.S. Pat. No. 5,520,124.

BACKGROUND OF THE INVENTION

1. Field of the Invention

The invention relates to asphalt plants. More particularly, the invention relates to a method for disposing of paper in an asphalt plant.

2. Discussion of Prior Art

Asphalt paving of the type used for roadway surfacing typically includes stone aggregate and asphalt cement (hereinafter "asphalt"). As used herein, "asphalt" includes those mixtures of primarily hydrocarbon materials commonly referred to as "asphalt" and other binder materials suitable for producing asphalt paving or similar paving when mixed with stone aggregate. As used herein, "stone aggregate" includes any aggregate material suitable for use in asphalt paving or similar paving for roadway surfacing. Asphalt paving is produced in an asphalt plant, typically by heating and thus drying the stone aggregate, and then mixing the hot stone aggregate with liquid asphalt. Typically, asphalt paving includes about 5% of asphalt and about 95% of stone aggregate.

U.S. Pat. No. 5,273,355 relates to an aggregate dryer and soil incinerator. The apparatus is adapted to heat and dry stone aggregate useful in the production of asphalt paving, and also is adapted to incinerate contaminated soil. The apparatus comprises a rotary dryer for heating and drying the stone aggregate, and a separate rotary incinerator for incinerating the soil.

SUMMARY OF THE INVENTION

The invention provides a method for disposing of paper by incinerating the paper in an asphalt plant and incorporating the ash into the asphalt paving.

The invention provides a method for disposing of paper by incinerating the paper in an asphalt plant, such that incineration of the paper contributes thermal energy for producing asphalt paving.

More particularly, the invention provides an asphalt plant including feed bins for providing stone aggregate and a container, such as a rotary dryer, for drying and heating the stone aggregate. The asphalt plant also includes a burner for providing thermal energy to dry and heat the stone aggregate in the dryer. The burner includes a supply of burner fuel and a supply of burner air and produces a flame. The flame is directed into the dryer for supplying thermal energy to dry and heat the asphalt aggregate in the dryer. The burner is positioned at one end of the dryer, such that atmospheric air is supplied to the flame and interacts with the flame to produce a hot airstream which passes through the dryer. The asphalt plant also includes an air filter which collects particles from the hot airstream as a filter residue. Preferably, the filter residue is incorporated into the asphalt paving. The asphalt plant also includes a supply of asphalt and a mixer for mixing the stone aggregate and asphalt to produce asphalt paving.

The asphalt plant also includes a stream of oxygen or air, such as compressed air. The stream of air is introduced into the flame. The asphalt plant includes a supply of paper, such as comminuted paper, which is introduced into the stream of

2 air. The comminuted paper is mixed with and entrained in the stream of compressed air. The small stream of compressed air may provide an excess amount of oxygen in the immediate vicinity of the comminuted paper for a brief period. The comminuted paper thus is substantially incinerated in the flame and contributes thermal energy for heating and drying the stone aggregate and producing the asphalt paving. A small proportion of ash is produced by incineration of the comminuted paper and incorporated into the asphalt paving.

The invention also provides an asphalt plant which includes a dryer unit having therein a grate which is generally perpendicular to the direction of flow of the burner flame and the hot airstream. The burner flame and hot airstream extend and pass through openings in the grate. The grate improves the thermal efficiency of the dryer unit for heating and drying the stone aggregate. In one embodiment, the grate improves the combustion efficiency of the dryer unit for incinerating paper.

Other features of and advantages of the invention will become apparent to those skilled in the art upon review of the following detailed description, claims, and drawings.

BRIEF DESCRIPTION OF THE DRAWINGS

FIG. 3 is a schematic diagram of an asphalt plant which is an alternative embodiment of the invention.

FIG. 4 is an enlarged, partial sectional view of the drying unit in the asphalt plant shown in FIG. 3.

FIG. 5 is a view of the grate taken generally along line 5—5 in FIG. 4.

FIG. 6 is a view of the burner taken generally along line 6—6 in FIG. 4.

Figure 1:
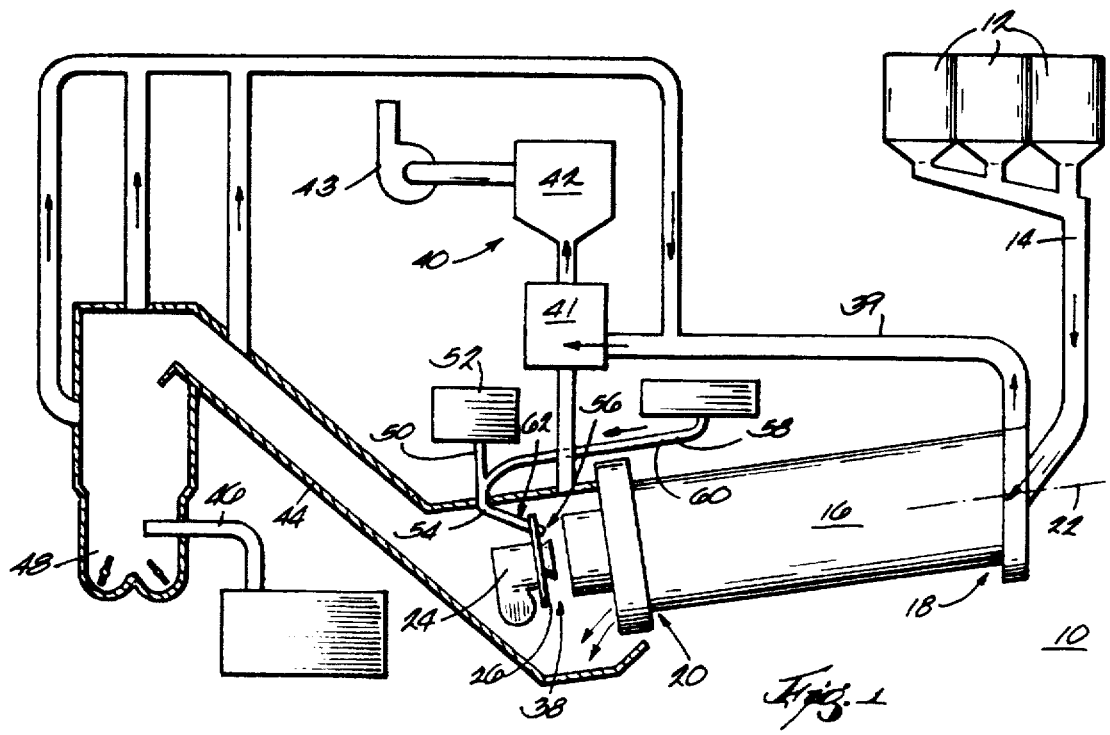
FIG. 1 is a schematic diagram of an asphalt plant including various features of the invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF A PREFERRED EMBODIMENT

Illustrated in FIG. 1 is an asphalt plant 10 for producing asphalt paving and which is adapted for disposing of paper. Although another suitable type of asphalt plant, such as a drum mix plant, can be used, in the illustrated embodiment the asphalt plant 10 is a batch plant.

The asphalt plant 10 includes feed bins 12 for providing stone aggregate. In the illustrated embodiment, the feed bins 12 are adapted to provide three types, or any mixture thereof, of stone aggregate. A conveyor or feed conduit 14 communicates with the feed bins 12. In the illustrated embodiment, the proportion of stone aggregate is not appreciably reduced by the amount of ash incorporated into the asphalt. In one embodiment, the proportion of stone aggregate in the asphalt paving may be slightly less than the typical proportion (about 95%), being slightly reduced from the typical proportion by an amount roughly equal to the ash produced upon incineration of the paper and incorporated into the asphalt paving.

The asphalt plant 10 includes a drum or container 16 for drying and heating the stone aggregate. In the illustrated embodiment, the container 16 is a rotary dryer. The dryer 16 includes an inlet end 18 and an outlet end 20 spaced from the inlet end 18. The dryer 16 rotates about a longitudinal axis 22. The feed conduit 14 communicates with the inlet end 18 of the dryer 16 for delivering the stone aggregate from the feed bins 12 to the rotary dryer 16. The dryer 16 has therein flights which lift and advance the stone aggregate as the dryer rotates. The stone aggregate thus moves through the dryer 16 from the inlet end 18 to the outlet end 20.

Figure 2:
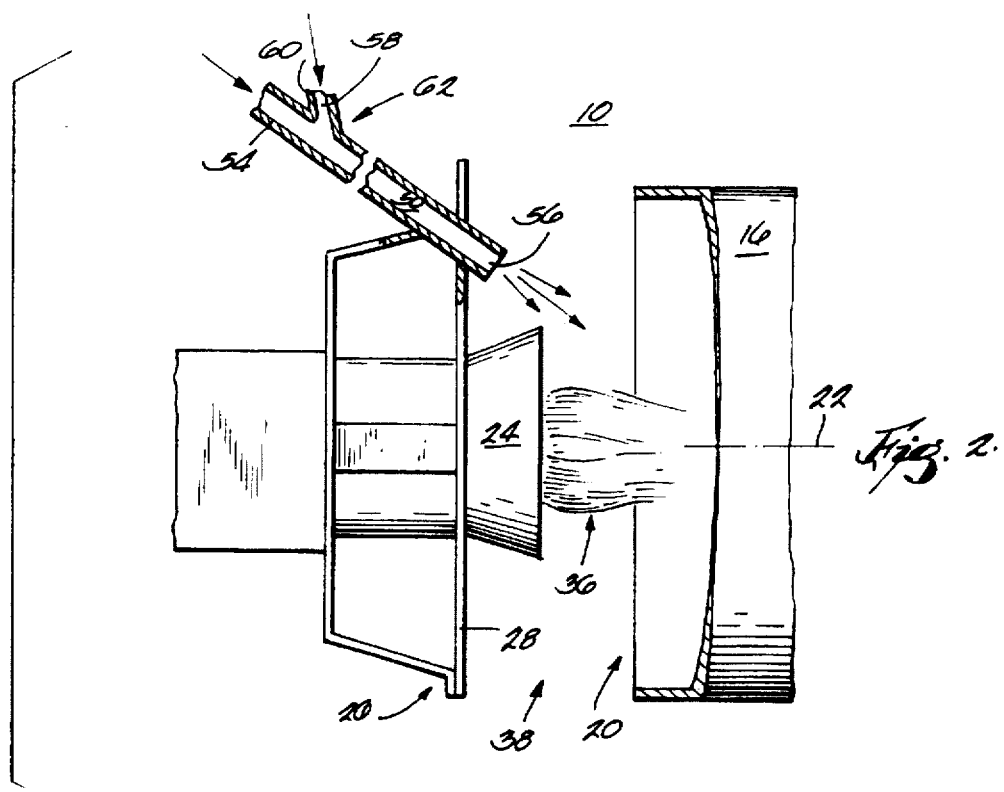
FIG. 2 is enlarged view of the dryer and burner illustrated in FIG. 1.

The asphalt plant 10 includes a burner 24 for providing thermal energy to dry and heat the stone aggregate in the dryer 16. A support structure 26 supports the burner 24. In the illustrated embodiment, the support structure 26 includes a wall 28. The wall 28 surrounds the burner 24 and extends perpendicularly to the longitudinal axis 22. The burner 24 includes a supply of burner fuel, which in the illustrated embodiment is oil. The amount of burner fuel typically is in the range of several hundred gallons of oil per hour. The burner 24 also includes a supply of burner air. The amount of burner air typically is in the range of several thousands of cubic feet per minute. As best shown in FIG. 2. the burner 24 produces a flame 36. The burner flame 36 typically produces several million BTU's per hour of thermal energy.

In the illustrated embodiment, the burner 24 is positioned at the outlet end 20 of the dryer 16. The flame 36 is directed into the outlet end 20 of the dryer 16 for supplying thermal energy to dry and heat the stone aggregate in the dryer 16. In the illustrated embodiment, the burner 24 and wall 28 are spaced slightly from the outlet end 20 of the dryer 16, such that an opening 38 is defined between the burner 24 and wall 28 and the outlet end 20. In another embodiment, the burner and wall are not spaced from the end of the dryer, so that the burner is enclosed. Ambient or atmospheric air is supplied to the dryer 16 and flame 36 through the opening 38. The flame 36 interacts with the atmospheric air to produce a hot airstream which passes through the dryer 16 from the outlet end 20 to the inlet end 18. The hot airstream passes out of the dryer 16 at the inlet end 18. The amount of atmospheric air supplied to the dryer typically is several tens of thousands of cubic feet per minute.

The asphalt plant 10 includes an air conduit 39 which communicates with the dryer 16 and a baghouse or dust collector 40. The hot airstream flows from the dryer 16, through the conduit 39 and into the dust collector 40. The dust collector 40 includes a primary air filter 41 and a secondary air filter 42. The dust collector 40 also includes an exhaust fan 43 for drawing the hot airstream through the air filters 41 and 42 and expelling the filtered airstream into the atmosphere. As the hot airstream passes through the primary and secondary air filters 41 and 42, suspended particles are collected as a filter residue. Preferably, the filter residue is incorporated into the asphalt paving, such as by periodically mixing the filter residue into the asphalt paving in the pugmill.

The asphalt plant 10 includes a secondary conveyor or conduit 44. In the illustrated embodiment, the secondary conduit 44 is a bucket elevator. The secondary conduit 44 communicates with the outlet end 20 of the dryer 16 to remove dried and heated stone aggregate from the dryer 16.

The asphalt plant 10 includes a supply 46 of asphalt cement or asphalt. In the illustrated embodiment, the asphalt is a liquid mixture of primarily hydrocarbon materials. In different embodiments, the asphalt may be another binder material suitable for producing asphalt paving or similar paving when mixed with stone aggregate. In the illustrated embodiment, the proportion of asphalt in the asphalt paving is about 5%.

The asphalt plant 10 includes a mixer 48 for mixing the stone aggregate and asphalt to produce asphalt paving. Although any suitable mixer may be used, in the illustrated embodiment the mixer 48 is a pugmill. In another embodiment, such as a drum-mix asphalt plant, the container for drying the aggregate includes the mixer. The secondary conduit 44 communicates with the pugmill 48 to provide the dried and heated stone aggregate from the dryer 16 to the pugmill 48. The supply 46 of asphalt communicates with the pugmill 48 to provide liquid asphalt to the pugmill 48. The pugmill 48 mixes the stone aggregate and asphalt to produce asphalt paving. The asphalt paving is delivered by gravity to a truck or storage container (not shown) for transportation to a remote site for incorporation into a roadway surface.

The asphalt plant 10 also includes a supply or stream 50 of oxygen or air. In the illustrated embodiment, the stream 50 is pressurized or compressed air. The stream 50 of compressed air is provided from an air compressor 52. A conduit 54 delivers the compressed air from the air compressor 52 to the dryer 16. In the illustrated embodiment, the conduit 54 is a flexible hose. The conduit 54 has an outlet 56. In the illustrated embodiment, the outlet 56 is a steel nozzle or fitting mounted in the wall 28. The outlet 56 directs the stream 50 of compressed air leaving the conduit 54 at an angle relative to the longitudinal axis 22. The outlet 56 thus introduces the stream 50 of compressed air into the flame 36. In another embodiment, the asphalt plant may include a plurality of conduits and outlets for directing a plurality of streams of air into the flame. In another embodiment, the stream of compressed air is introduced in close proximity to the flame 36. Although different proportions of air can be used, in the illustrated embodiment, the stream 50 of compressed air is small in comparison to the amount of burner air and atmospheric air supplied to the burner and dryer. For example, in one embodiment about 150 cubic feet per minute of compressed air was supplied to a dryer using several thousand cubic feet per minute of burner air and several tens of thousands of cubic feet per minute of atmospheric air.

The asphalt plant 10 further includes a supply 58 of paper. The paper can be in any suitable form, and in the illustrated embodiment the paper is comminuted. More particularly, in the illustrated embodiment the paper is comminuted by shredding. The comminuted or shredded paper can be of any suitable size, varying over a broad range. In one embodiment, the shredded paper has an average width in the range of about 0.25 inches to about 0.5 inches and a length in the range of about 2 inches to about 14 inches or more. In one embodiment, the comminuted paper has an average width in the range of about 0.5 inches to about 2 inches and a length in the range of about 0.5 inches to about 2 inches. The supply 58 of comminuted paper is connected to the conduit 54 to introduce the comminuted paper into the stream 50 of compressed air. In the illustrated embodiment, the supply 58 of comminuted paper includes a flexible hose or conduit 60 which is connected to the conduit 54 by a Y-fitting 62. The comminuted paper is drawn or introduced into the stream 50 of compressed air, such that the comminuted paper is mixed with and entrained in the stream 50 of compressed air. Thus, the stream 50 of compressed air having therein the entrained comminuted paper is introduced into the flame 36. The compressed air 50 provides a large or excess amount of oxygen in the immediate vicinity of the comminuted paper. Therefore, the comminuted paper is substantially incinerated in the flame 36. The comminuted paper thus contributes thermal energy for heating and drying the stone aggregate and producing the asphalt paving. Although the proportion of paper introduced into the dryer 16 can vary over a broad range, such as from less than 1% to about 10% or more, in the illustrated embodiment the proportion of paper introduced into the dryer is about 2% to about 3%, based upon the total weight of the asphalt paving.

As used herein "paper" includes paper and suitable non-hazardous incinerable materials. As used herein, "incinerable" material means a material which is combustible in the presence of air or oxygen under the temperature and pressure conditions useful for producing asphalt paving, or which is otherwise suitably degraded by incineration or other thermal degradation processes under the temperature and pressure conditions useful for producing asphalt paving. As used herein, "non-hazardous" materials includes materials which upon incineration do not produce gases, liquids or solids which are classified under applicable law as hazardous to human health or the environment. As used herein, "non-hazardous" materials may also include materials which when incinerated can produce gases, liquids or solids which are classified under applicable law as hazardous to human health or the environment when present in air, water, soil or other media in concentrations exceeding levels established by law, but which are not, in fact, produced in concentrations which exceed these established levels in the relevant media. As used herein, "non-hazardous" materials may also include materials which when incinerated can produce gases, liquids or solids which are classified under applicable law as hazardous to human health or the environment when present in air, water, soil or other media in concentrations exceeding the levels established by law, and which are produced in concentrations which exceed the established levels in the relevant media, but which can be shown by scientific theory or testing to be intermediate products or to be products which are themselves degraded or destroyed by incineration or which are immobilized by incorporation into asphalt paving. Non-hazardous incinerable materials may include, for example, materials such as wood chips, cardboard, plastics, food waste, and household refuse from which hazardous materials and non-incinerable materials (such as most metals) have been removed. Non-hazardous incinerable materials may also include, for example, mixtures of non-hazardous incinerable materials and other materials, such as gypsum, which can be suitably incorporated into asphalt paving.

A relatively small amount or proportion of ash is produced by incineration of the comminuted paper and incorporated into the asphalt paving. The amount of ash is greatly reduced from the proportion of paper introduced into the dryer 16. A portion of the ash will fall into and be mixed with the stone aggregate in the dryer 16, and thus will be incorporated into the asphalt paving with the stone aggregate. A portion of the ash may be carried out of the dryer 16 in the hot airstream to the filter 40, and will be incorporated into the filter residue. Preferably, the filter residue is mixed into the asphalt paving, and thus, this portion of the ash will be incorporated into the asphalt paving. The relatively small proportion of ash incorporated into the asphalt paving does not substantially adversely affect the utility of the asphalt paving for roadway surfacing. In the illustrated embodiment, the asphalt paving includes less than about 4% to about 7% of fine dust or ash, and thus has a suitably high proportion of air voids. In the illustrated embodiment, "fine" dust or ash means size P-200 or smaller. In other embodiments, the amount of size P-200 dust or ash may be adjusted to provide a suitable proportion of air voids in the asphalt paving. Typically, asphalt paving must include at least about 3% of air voids in order to prevent rutting under traffic.

The invention thus provides a method for disposing of paper in an asphalt plant as set forth above. The method includes the step of providing a container, such as a dryer, for heating the stone aggregate, and providing in the container a burner for producing a flame to provide thermal energy for heating the stone aggregate in the container. A stream of air is introduced into the burner flame. Paper is introduced into and entrained in the stream of air, and the stream of air having therein the entrained paper is introduced into the burner flame. The stream of air provides oxygen in the immediate vicinity of the paper, and the paper is incinerated in the container. Incineration of the paper produces ash which is incorporated into asphalt paving produced by the asphalt plant. Incineration of the paper thus contributes thermal energy for producing the asphalt paving.

The invention provides a method for producing asphalt paving including stone aggregate, asphalt and a small proportion of ash from paper incinerated in the asphalt plant. The asphalt paving is produced as set forth above.

The invention also provides asphalt paving including stone aggregate, asphalt and a small proportion of ash from paper incinerated in the asphalt plant. The asphalt paving is produced as set forth above.

Ash resulting from incineration of the paper in the asphalt plant may serve as a so-called "extender" for the asphalt paving. As used herein, "extender" means that the amount of asphalt paving produced from a given amount of stone aggregate and asphalt is increased slightly by the presence of the ash. It is believed that the ash acts as an "extender" with regard to the amount of asphalt required to produce the asphalt paving.

It is advantageous that paper is disposed in the asphalt plant, and resulting ash is incorporated into the asphalt paving.

It is a further advantage that incineration of the paper contributes thermal energy for producing the asphalt paving, and reduces the amount of burner fuel necessary for producing the asphalt paving.

Illustrated in FIGS. 3–6 is an asphalt plant 110 which is an alternative embodiment of the invention. Unlike the previously described asphalt plant 10, the asphalt plant 110 is not particularly adapted for disposing of paper. Although any other suitable type of asphalt plant, such as a drum mix plant, can be used, in the illustrated embodiment the asphalt plant 110 is a batch plant.

The asphalt plant 110 includes feed bins 112 for providing stone aggregate. A conveyor or feed conduit 114 communicates with the feed bins 112.

The asphalt plant 110 includes a dryer unit 115 for heating and drying the stone aggregate. The dryer unit 115 includes a drum or container 116. In the illustrated embodiment, the container 116 is a counterflow rotary dryer. It should be understood that in another embodiment (not shown), another type of dryer, such as a parallel-flow dryer, can be used. The dryer 116 is a cylindrical vessel which has an inlet end 118 and an outlet end 120 and which rotates about a longitudinal axis 122. The feed conduit 114 communicates with the inlet end 118 for delivering the stone aggregate from the feed bins 112 to the dryer 116. The dryer 116 has therein flights which lift and advance the stone aggregate as the dryer rotates. The stone aggregate thus moves through the dryer 116 from the inlet end 118 to the outlet end 120.

The dryer 116 has a main chamber 119 having a large diameter. At the outlet end 120 the dryer 116 has a reduced diameter passage 121 which communicates between the main chamber 119 and a burner, as further described below. In the illustrated embodiment, the passage 121 is lined with refractory brick and has an inner diameter of about 24" and a length of about 32".

The dryer unit 115 includes a burner 124 for providing a burner flame which provides thermal energy to dry and heat the stone aggregate in the dryer 116. A support structure 126 supports the burner 124. In the illustrated embodiment, the support structure 126 includes a wall 128 (FIG. 4) which surrounds the burner 124 and extends perpendicularly to the longitudinal axis 122. A supply (not shown) of burner fuel 129 is connected to the burner 124. Any suitable burner fuel 129, such as oil or natural gas, can be used. In the illustrated embodiment, the burner fuel 129 is oil. The burner fuel 129 is ejected under pressure from the burner 124 in a plurality of streams of atomized particles. The amount of burner fuel typically is in the range of several hundred gallons of oil per hour. As shown in FIG. 6, the burner 124 has an annular set of fins 125 for distributing the streams of atomized particles of burner fuel in an annular pattern. The burner 124 also includes a blower (not shown) for generating a flow of burner air.

The dryer unit 115 includes a primary supply of air 131. In the illustrated embodiment, the primary supply of air 131 is atmospheric air which enters or is drawn into the area of the burner flame through the open space 132 between the dryer 116 and the wall 128. The amount of primary air 131 typically is in the range of several tens of thousands of cubic feet per minute.

As best shown in FIG. 4, the burner 124 produces a burner flame 136 which extends through an opening and into the reduced diameter passage 121. The burner flame 136 interacts with the primary air 131 to produce a hot airstream which passes rapidly through the dryer 116 from the outlet end 120 to the inlet end 118. The hot airstream passes out of the dryer 116 at the inlet end 118.

The asphalt plant 110 also includes a grate 133 which is mounted in the reduced diameter passage 121 of the dryer 116. The burner flame 136 and hot airstream pass through the grate 133. In the illustrated embodiment, the grate 133 includes a plurality of cross members 135 and a continuous annular outer edge member 137. The grate 133 is supported by radially spaced supports 139 which are mounted on the dryer 115. The cross members 135 cooperate to define a plurality of small openings 138. In the specific embodiment illustrated, each of the openings is about 2" wide, and the outer edge member 137 is about 22" in diameter. The cumulative cross sectional area of the openings 138 of the grate 133 is less than the cross sectional area of the passage 121. The grate 133 is constructed of a material, such as tungsten or a heat-resistant ceramic material, which is resistant to heat and oxidation in the burner flame 136. It is possible that a material such as stainless steel, which is moderately resistant to heat and oxidation in the burner flame 136, can be used and replaced frequently. The grate 133 improves the thermal efficiency of the burner 124 for heating and drying the stone aggregate, and thus reduces the amount of burner fuel 129 which is required to dry and heat the stone aggregate. The grate 133 thus increases the efficiency of the dryer unit 115 for heating and drying stone aggregate. While the applicant is uncertain specifically why the grate 133 improves the thermal efficiency of the burner 124, it is believed that the grate 133 reduces the velocity of the burner flame 136 and the hot airstream in the area near the burner 124, such that the burner fuel 129 is exposed to an environment which contains adequate oxygen for combustion for a longer period than if the burner flame 136 and hot airstream were unimpeded by the grate.

The asphalt plant 110 includes an air conduit 139 which communicates with the dryer 116 and a baghouse or dust collector 140. The hot airstream flows from the dryer 116, through the conduit 139 and into the dust collector 140. The dust collector 140 includes a primary air filter 141 and a secondary air filter 142. The dust collector 140 also includes an exhaust fan 143 for drawing the hot airstream through the air filters 141 and 142 and expelling the filtered airstream into the atmosphere.

The asphalt plant 110 includes a secondary conveyor or conduit 144 which communicates with the outlet end 120 of the dryer 116 to remove dried and heated stone aggregate from the dryer 116. The secondary conduit 144 communicates with a pugmill 148 to provide the dried and heated stone aggregate from the dryer 116 to the pugmill 148. The asphalt plant 110 also includes a supply 146 of asphalt cement or asphalt. The supply 146 of asphalt communicates with the pugmill 148 to provide liquid asphalt to the pugmill 148. The pugmill 148 mixes the stone aggregate and asphalt to produce asphalt paving.

It is an advantage that the burner flame 136 and hot airstream extend and pass through the grate 133, such that the thermal efficiency of the dryer unit 115 for heating and drying the stone aggregate is improved.

Figure 7:
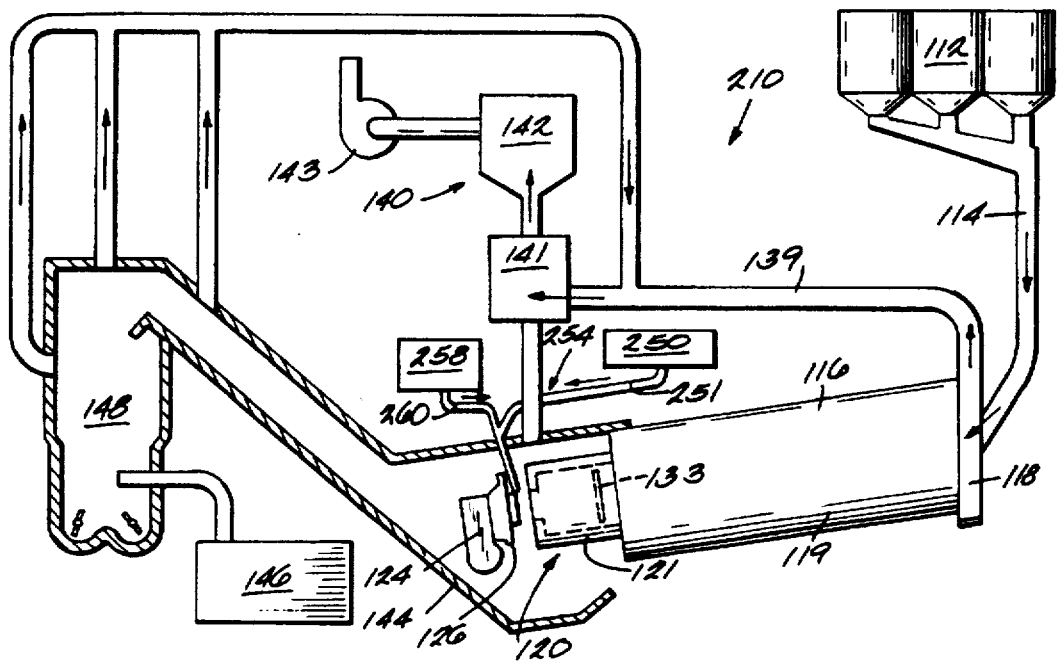
FIG. 7 is a schematic diagram of an asphalt plant which is a second alternative embodiment of the invention.
Figure 8:
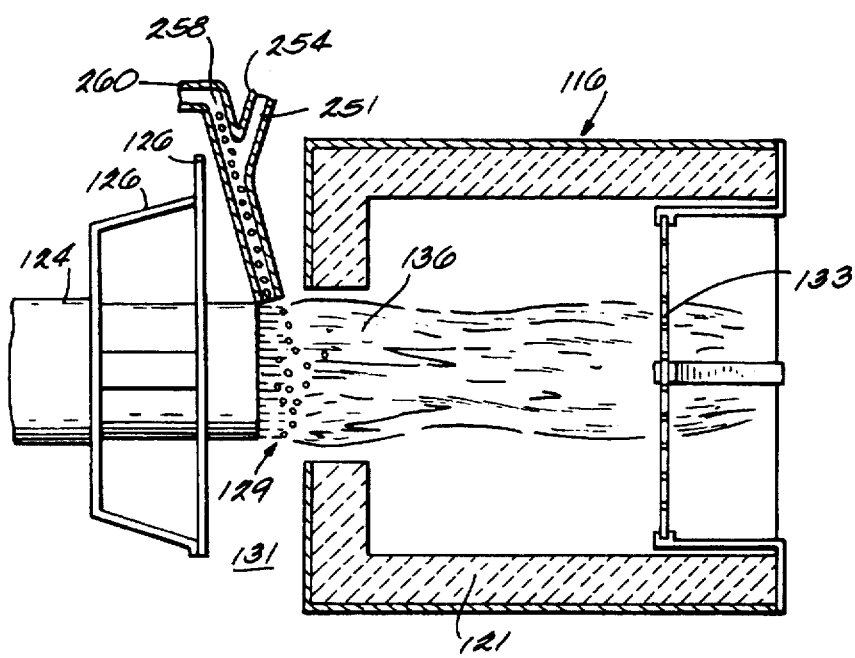
FIG. 8 is an enlarged, partial sectional view of the drying unit in the asphalt plant shown in FIG. 7.

Illustrated in FIGS. 7–8 is an asphalt plant 210 which is a second alternative embodiment of the invention. Except as otherwise described, the asphalt plant 210 is identical to the asphalt plant 110. Accordingly, common elements are identified by the same reference numbers.

The drying unit 115 of the asphalt plant 210 includes a secondary supply 250 of an oxygen-containing gas. In the illustrated embodiment, the oxygen-containing gas is air. More particularly, in the illustrated embodiment, the secondary supply 250 is a secondary stream 251 of pressurized or compressed air. In another embodiment, the asphalt plant may include a plurality of such secondary streams of compressed air. The compressed air is provided from an air compressor (not shown). A conduit 254 delivers the secondary stream 251 of compressed air from the air compressor to the base of the burner flame 136. The conduit 254 has an outlet which directs the secondary stream 251 of compressed air toward the streams of atomized particles of burner fuel 129 at the base of the burner flame 136 at an angle which is generally perpendicular to the direction of travel of the burner fuel exiting the burner 124. The secondary stream 251 of compressed air thus is introduced into the streams of atomized particles of burner fuel 129 at the base of the burner flame 36. Although a differently sized secondary stream of air can be used, in the illustrated embodiment, the secondary stream 251 is small in comparison to the amount of burner air. For example, in one embodiment about 150 cubic feet per minute of compressed air is supplied to a dryer using several thousand cubic feet per minute of burner air.

The asphalt plant 210 further includes a supply 258 of paper. The paper can be in any suitable form, and in the illustrated embodiment the paper is comminuted. More particularly, in the illustrated embodiment the paper is comminuted by shredding. The comminuted or shredded paper can be of any suitable size, varying over a broad range. In one embodiment, the shredded paper has an average width in the range of about 0.25 inches to about 0.5 inches and a length in the range of about 2 inches to about 4 inches or more. In one embodiment, the comminuted paper has an average width in the range of about 0.5 inches to about 2 inches and a length in the range of about 0.5 inches to about 2 inches. Preferably, the paper is finely comminuted and has a width and length or maximum dimension of 0.5 inches. The supply 258 of comminuted paper is connected to the conduit 254 to introduce the comminuted paper into the secondary stream 251 of compressed air. In an alternative embodiment (not shown), the comminuted paper is introduced directly into the flame without being introduced into a secondary stream of compressed air. In the illustrated embodiment, the supply 258 of comminuted paper includes a flexible hose or conduit 260 which is connected to the conduit 254 by a Y-fitting. The comminuted paper is drawn or introduced into the secondary stream 251 of compressed air, such that the comminuted paper is mixed with and entrained in the stream 50 of compressed air. Thus, the secondary stream 251 (FIG. 8) of compressed air having therein the entrained comminuted paper is introduced into the streams of atomized particles of burner fuel 129 at the base of the burner flame 136. By introducing the secondary stream 251 in the direction perpendicular to the direction of travel of the burner fuel 129, the residence period of the paper in the oxygen-containing environment or portion of the burner flame is increased. More particularly, it is believed that the availability of oxygen for combustion of the paper is greatest in the portion of the burner flame 136 which is nearest the atmospheric or primary air 131 and, accordingly, the secondary stream 251 of compressed air and entrained paper is introduced at the base of the burner flame 136 such that the residence period of the paper in the oxygen-containing environment is maximized or improved. The secondary stream 251 of compressed air may provide an excess amount of oxygen in the immediate vicinity of the comminuted paper for a brief period. The comminuted paper is substantially incinerated in the burner flame 136. The comminuted paper thus contributes thermal energy for heating and drying the stone aggregate and producing the asphalt paving. Although the proportion of paper introduced into the dryer can vary over a broad range, such as from less than 1% to about 10% or more, in the illustrated embodiment the proportion of paper introduced into the dryer is about 2% to about 3%, based upon the total weight of the asphalt paving.

A relatively small amount or proportion of ash is produced by incineration of the comminuted paper. The ash is incorporated into the asphalt paving with the stone aggregate, as previously described.

It is an advantage that the burner flame 136 and hot airstream extend and pass through the grate 133, such that the combustion efficiency of the dryer unit 115 for incinerating paper is improved.

Various features of the invention are set forth in the following claims.

What is claimed is:

1. An asphalt plant for producing asphalt paving, said asphalt plant comprising:
    a) a dryer unit for heating stone aggregate, said dryer unit including a container and a burner for producing a flame to provide thermal energy for heating the stone aggregate in the container;
    b) a supply of burner fuel for providing fuel for the burner flame;
    c) a supply of burner air for providing oxygen to the burner flame; and
    d) said dryer unit including a grate which is spaced from the burner, the grate defining a plurality of openings, such that the burner flame extends through the openings, and such that the grate improves the thermal efficiency of the dryer unit for heating the stone aggregate.

2. An asphalt plant as set forth in claim 1 and wherein the container has therein an open passage into which the burner flame extends, the grate being mounted in the passage in an orientation which is generally perpendicular to the burner flame and to the flow of gas through the passage.

3. An asphalt plant as set forth in claim 2 and wherein the passage has a cross sectional area, and the openings of the grate define a cumulative cross sectional area which is less than the cross sectional area of the passage.

4. An asphalt plant as set forth in claim 1 and further including a supply of paper connected to the dryer unit such that the paper is introduced into the burner flame and is substantially incinerated in the dryer unit.

5. An asphalt plant as set forth in claim 4 and further including a secondary supply of air connected to the dryer unit for providing a secondary stream of air into burner fuel at the base of the burner flame, the supply of paper being connected to the secondary supply of air for introducing paper into the secondary stream of air, such that the paper is entrained in the secondary stream of air and is introduced with the secondary stream of air into the burner flame.

6. The apparatus as set forth in claim 5 and wherein said supply of air is compressed air.

7. The apparatus as set forth in claim 4 and wherein incineration of the paper contributes thermal energy for producing the asphalt paving.

8. An asphalt plant as set forth in claim 4 and wherein incineration of the paper produces ash, the asphalt plant further including means for mixing the stone aggregate and ash with asphalt to produce asphalt paving.

9. An asphalt plant for producing asphalt paving, said asphalt plant comprising:
    a) a dryer unit for heating stone aggregate, said dryer unit including a container, said dryer unit including a burner for producing a flame to provide thermal energy for heating the stone aggregate in the container, said dryer unit including a grate which is spaced from the burner, the grate defining a plurality of openings;
    b) a supply of burner fuel for providing fuel for the burner flame;
    c) a supply of burner air for providing oxygen to the burner flame;
    d) the burner flame extending through the openings in the grate, such that the grate improves the thermal efficiency of the dryer unit for heating the stone aggregate; and
    e) a supply of paper connected to the dryer unit such that the paper is introduced into the burner flame and is substantially incinerated in the dryer unit.

10. An asphalt plant as set forth in claim 9 and wherein the container has therein an open passage into which the burner flame extends, the grate being mounted in the passage in an orientation which is generally perpendicular to the burner flame and to the flow of gas through the passage.

11. An asphalt plant as set forth in claim 10 and wherein the passage has a cross sectional area, and the openings of the grate define a cumulative cross sectional area which is less than the cross sectional area of the passage.

12. An asphalt plant as set forth in claim 9 and further including a secondary supply of air connected to the dryer unit for providing a secondary stream of air into the burner flame, the supply of paper being connected to the secondary supply of air for introducing paper into the secondary stream of air, such that the paper is entrained in the secondary stream of air and is introduced with the secondary stream of air into the burner flame.

13. The apparatus as set forth in claim 12 and wherein said supply of air is compressed air.

14. The apparatus as set forth in claim 9 and wherein incineration of the paper contributes thermal energy for producing the asphalt paving.

15. An asphalt plant as set forth in claim 9 and wherein incineration of the paper produces ash, the asphalt plant further including means for mixing the stone aggregate and ash with asphalt to produce asphalt paving.

16. A method for operating an asphalt plant, said method comprising the steps of:
   a) introducing stone aggregate into a dryer unit to heat the stone aggregate, the dryer unit including a container and a burner for producing a flame to provide thermal energy for heating the stone aggregate in the container;
   b) supplying burner air for providing oxygen to the burner flame; and
   c) causing the burner flame to extend through a plurality of openings in a grate which is spaced from the burner, such that the grate improves the thermal efficiency of the dryer unit for heating the stone aggregate.

17. The method as set forth in claim 16 and including the step of supplying paper to the dryer unit such that the paper is introduced into the burner flame and is substantially incinerated in the dryer unit.

18. The method as set forth in claim 17 and including the steps of supplying a secondary stream of air into the burner flame, and introducing the paper into the secondary stream of air such that the paper is entrained in the secondary stream of air and is introduced with the secondary stream of air into the burner flame.

19. The method as set forth in claim 17 and wherein incineration of the paper produces ash, and including the step of mixing the stone aggregate and ash with asphalt to produce asphalt paving.

20. A method for operating an asphalt plant, said method comprising the steps of:
   a) introducing stone aggregate into a dryer unit to heat the stone aggregate, the dryer unit including a container and a burner for producing a flame to provide thermal energy for heating the stone aggregate in the container;
   b) supplying burner air for providing oxygen to the burner flame;
   c) causing the burner flame to extend through a plurality of openings in a grate which is spaced from the burner, such that the grate improves the thermal efficiency of the dryer unit for heating the stone aggregate; and
   d) supplying paper to the dryer unit such that the paper is introduced into the burner flame and is substantially incinerated in the dryer unit.

21. The method as set forth in claim 20 and including the steps of supplying a secondary stream of air into the burner flame, and introducing the paper into the secondary stream of air such that the paper is entrained in the secondary stream of air and is introduced with the secondary stream of air into the burner flame.

22. The method as set forth in claim 20 and wherein incineration of the paper produces ash, and including the step of mixing the stone aggregate and ash with asphalt to produce asphalt paving.

* * * * *